(12) United States Patent  
Citron et al.

(10) Patent No.: US 8,635,431 B2
(45) Date of Patent: Jan. 21, 2014

(54) VECTOR GATHER BUFFER FOR MULTIPLE ADDRESS VECTOR LOADS

(75) Inventors: Daniel Citron, Haifa (IL); Dorit Nuzman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 12/962,674

(22) Filed: Dec. 8, 2010

(65) Prior Publication Data

US 2012/0151156 A1  Jun. 14, 2012

(51) Int. Cl.
*G06F 15/76* (2006.01)
*G06F 12/08* (2006.01)

(52) U.S. Cl.
USPC ................... 712/4; 711/118; 711/213

(58) Field of Classification Search
None
See application file for complete search history.

(56) References Cited

U.S. PATENT DOCUMENTS

| 4,910,667 | A | 3/1990 | Tanaka et al. |
|---|---|---|---|
| 6,105,075 | A | 8/2000 | Ghaffari |
| 6,665,790 | B1 | 12/2003 | Glossner et al. |
| 6,813,701 | B1 | 11/2004 | Ansari |
| 7,308,559 | B2 | 12/2007 | Glossner et al. |
| 7,313,788 | B2 | 12/2007 | Ben-David et al. |
| 7,467,288 | B2 | 12/2008 | Glossner et al. |
| 7,487,296 | B1* | 2/2009 | Iacobovici et al. ........... 711/137 |
| 7,627,735 | B2 | 12/2009 | Espasa et al. |
| 2003/0204840 | A1 | 10/2003 | Wu |
| 2004/0073773 | A1 | 4/2004 | Demjanenko |
| 2008/0126623 | A1 | 5/2008 | Chang et al. |
| 2009/0228657 | A1 | 9/2009 | Hagiwara |
| 2012/0060016 | A1* | 3/2012 | Eichenberger et al. ........... 712/4 |

FOREIGN PATENT DOCUMENTS

WO    8906397    7/1989

OTHER PUBLICATIONS

Hoseok Chang and Wonyong Sung, "Efficient Vectorization of SIMD Programs With Non-Aligned and Irregular Data Access Hardware", Cases'08, Oct. 19-24, 2008, Atlanta, Georgia, USA. URL: http://doi.acm.org/10.1145/1450095.1450121.

Francisca Quintana et al., "Adding a Vector Unit to a Superscalar Processor", ICS '99 Rhodes '3cecc Copyright ACM 1999 I-581 13-164. URL:http://portal.acm.org/citation.cfm?id=305148.

John W. C. Fu and Janak H. Patel, "Prefetching in Multiprocessor Vector Cache Memories", 01991 ACM. URL:http://portal.acm.org/citation.cfm?id=115959&dl=GUIDE&coll=GUIDE&CFID=96839263&CFTOKEN=68378723, 1991.

* cited by examiner

*Primary Examiner* — Gary Portka (57) ABSTRACT

A dedicated vector gather buffer (VGB) that stores multiple cache lines read from a memory hierarchy in one or more Logical Units (LUs) each having multiple buffer entries and performs parallel operations on vector registers. Once loaded with data, an LU is read using a single port. The VGB initiates prefetch events that keep it full in response to the demand created by 'gather' instructions. The VGB includes one or more write ports for receiving data from the memory hierarchy and a read port capable of reading data from the columns of the LU to be loaded into a vector register. Data is extracted from the VGB by (1) using a separate port for each item read, (2) implementing each VGB entry as a shift register and shifting an appropriate amount until all entries are aligned, or (3) enforcing a uniform offset for all items.

22 Claims, 7 Drawing Sheets

VECTOR GATHER BUFFER FOR MULTIPLE ADDRESS VECTOR LOADS

FIELD OF THE INVENTION

The present invention relates to the field of data communications, and more particularly relates to a vector gather buffer for multiple address vector loads.

SUMMARY OF THE INVENTION

There is thus provided in accordance with the invention, a vector gather buffer (VGB) for use in a processor, comprising a plurality of buffer entry lines, each buffer entry line comprising a tag field and a data field, an effective address calculation circuit operative to generate one or more effective addresses in accordance with an input base address and offset, and at least one read port operative to read data items across columns of the plurality of buffer entry lines and store the data items in an output vector register.

There is also provided in accordance with the invention, a vector gather buffer (VGB) for use in a processor, comprising one or more logical units (LUs), each logical unit comprising a plurality of buffer entry lines, each buffer entry line comprising a tag field and a data field, at least one write port for transferring data from a memory hierarchy to the one or more LUs, an effective address calculation circuit operative to generate one or more effective addresses in accordance with an input base address and offset, and at least one read port operative to read data items across columns of the plurality of buffer entry lines in each LU and store the data items in an output vector register.

There is further provided in accordance with the invention, a method of extracting data from a vector gather buffer (VGB) for use in a processor, the method comprising providing one or more logical units (LUs), each logical unit comprising a plurality of buffer entry lines, each buffer entry line comprising a tag field and a data field, providing at least one read port operative to read data items across columns of the plurality of buffer entry lines in each LU and store the data items in an output vector register, calculating one or more effective addresses in accordance with an input base address and offset, comparing all tag entries in an LU with the effective addresses calculated, and if all comparisons match, declaring a hit signal and extracting data from the LU via the read port in accordance with the calculated effective addresses.

There is also provided in accordance with the invention, a vector gather buffer (VGB) for use in a processor, comprising one or more logical units (LUs), each logical unit comprising a plurality of buffer entry lines, each buffer entry line comprising a tag field, a data field and a prefetch field, at least one write port for transferring data from a memory hierarchy to the one or more LUs, prefetch circuitry operative to initiate prefetch operations for each buffer entry line in the one or more LUs, an effective address calculation circuit operative to generate one or more effective addresses in accordance with an input base address and offset, a tag comparison circuit operative to compare all tag entries in an LU with corresponding effective addresses calculated and if all comparisons match, declare a hit signal and extract data from the LU via the read port in accordance with the calculated effective addresses, and at least one read port operative to read data items across columns of the plurality of buffer entry lines in each LU in accordance with the calculated effective addresses and store the data items in an output vector register if all the comparisons match.

There is further provided in accordance with the invention, a method of extracting data from a vector gather buffer (VGB) for use in a processor, the method comprising providing one or more logical units (LUs), each logical unit comprising a plurality of buffer entry lines, each buffer entry line comprising a tag field, data field and prefetch field, providing at least one write port for transferring data from a memory hierarchy to the one or more LUs, providing at least one read port operative to read data items across columns of the plurality of buffer entry lines in each LU and store the data items in an output vector register, providing prefetch circuitry operative to initiate prefetch operations for each buffer entry line in the one or more LUs, calculating one or more effective addresses in accordance with an input base address and offset; comparing all tag entries in an LU with the effective addresses calculated, and if all comparisons match, declaring a hit signal and extracting data from the LU via the read port in accordance with the calculated effective addresses.

BRIEF DESCRIPTION OF THE DRAWINGS

The invention is herein described, by way of example only, with reference to the accompanying drawings, wherein.

DETAILED DESCRIPTION OF THE INVENTION

Many microprocessors today have vector execution units that perform parallel operations on vector registers. Vector processing instructions operate on several data items (e.g., bytes, words, double words, etc.) in parallel by storing them in dedicated vector registers. Operations can be performed on multiple elements (e.g., 4, 8, 16, etc.) at a time. Throughout this document, all examples use these instructions and assume a vector size of 16 bytes, 4 operations per vector (i.e. element size of 4 bytes) and a cache line size of 128 bytes. It is appreciated that the invention is applicable to other vector sizes, number of operations per vector and any other cache line size. Further, the instructions used in the examples presented infra are Power Instruction Set Architecture (ISA) instructions developed by IBM. It is appreciated that the invention is applicable as well to other processors having similar instructions.

Figure 1:
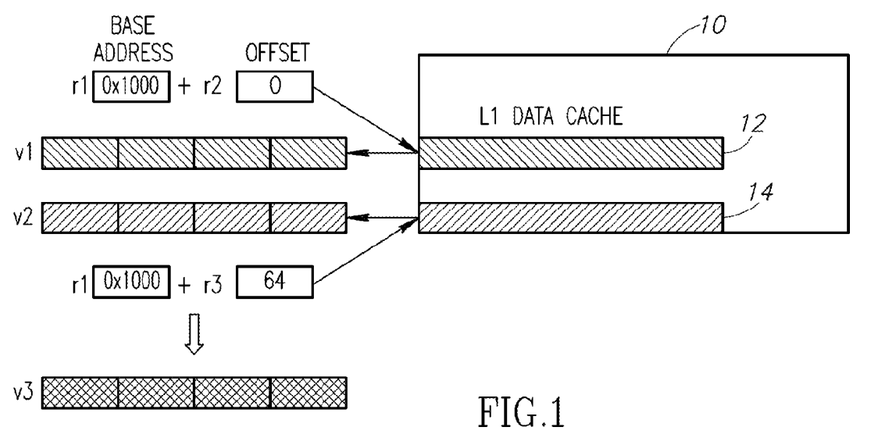
FIG. 1 is a block diagram illustrating an example vector register read operation.

A block diagram illustrating an example vector register read operation is shown in FIG. 1. In this example, the vector registers read contiguous memory. For example, in accordance with instruction lvx, v1, r1, r2 memory contents from r1+r2 are read into v1. In particular, 16 bytes 12 (i.e. 4 words of 4 bytes) from the L1 data cache 10 are read into vector register v1 according to the address formed from the base address r1 and offset r2. Similarly, in accordance with instruction lvx, v2, r1, r3 16 bytes 14 from the L1 data cache 10 are read into vector register v2 according to the address formed from the base address r1 and offset r3. In accordance with instruction vadduwm v3, v1, v2 vectors v1 and v2 are added together and stored in the results register v3.

Note that throughout this document, vector registers are prefixed with a 'v' and general purpose registers are prefixed with an 'r'. Vector registers contain the data loaded from memory and general purpose registers are used to calculate the address to load from.

To read from non-contiguous addresses, such as the columns of a matrix, the following mechanism is used. First, each word is read into a separate vector register. Each of the two vector registers is then permuted and the results permuted as well.

Figure 2:
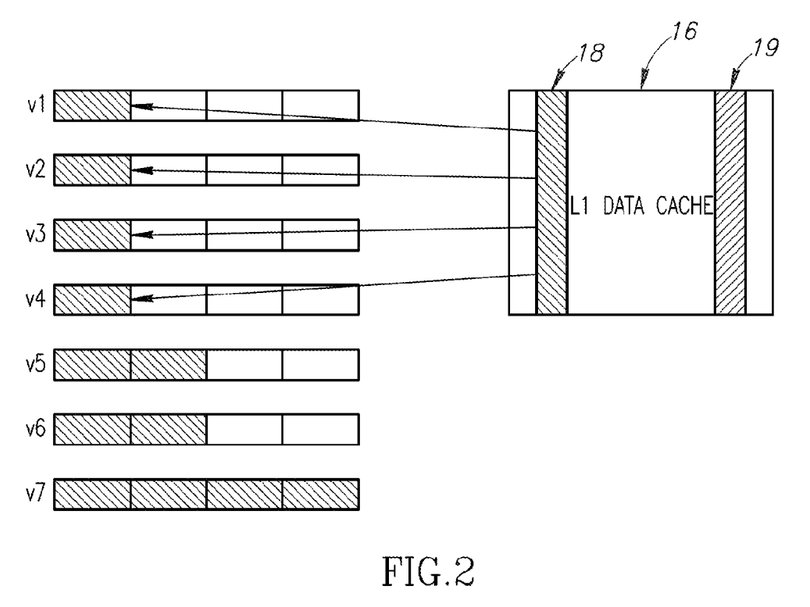
FIG. 2 is a block diagram illustrating an example of reading from non-contiguous memory addresses.

A block diagram illustrating an example of reading from non-contiguous memory addresses is shown in FIG. 2. To load data from either columns 18 (or 19) (each column is 4 bytes wide) in L1 data cache 16, Four load instructions are required to load 4 byte words in to each of v1, v2, v3, v4. Instruction vperm 5, v1, v2, v10 functions to permute vector registers v1 and v2 based on the mask in v10 (not shown). Similarly, the data in v3 and v4 are permuted using vperm 6, v3, v4, v10. Finally, data in vector registers 5 and 6 are permuted using vperm 7, v3, v4, v11 (mask in v11 not shown). The final result is stored in 7. Note that four words of four bytes each are read. In order to read a column of 16 bytes where the column width is one byte 16 such loads would have to be executed.

In one embodiment, operations referred to as scatter/gather operations can be used to collect (or gather) data from several addresses and load it into a single vector register. Alternatively, the data is stored from one vector register to several memory locations (i.e. scatter). In either case, the addresses can be specified by a vector of addresses or by one address and fixed stride offsets.

Figure 3:
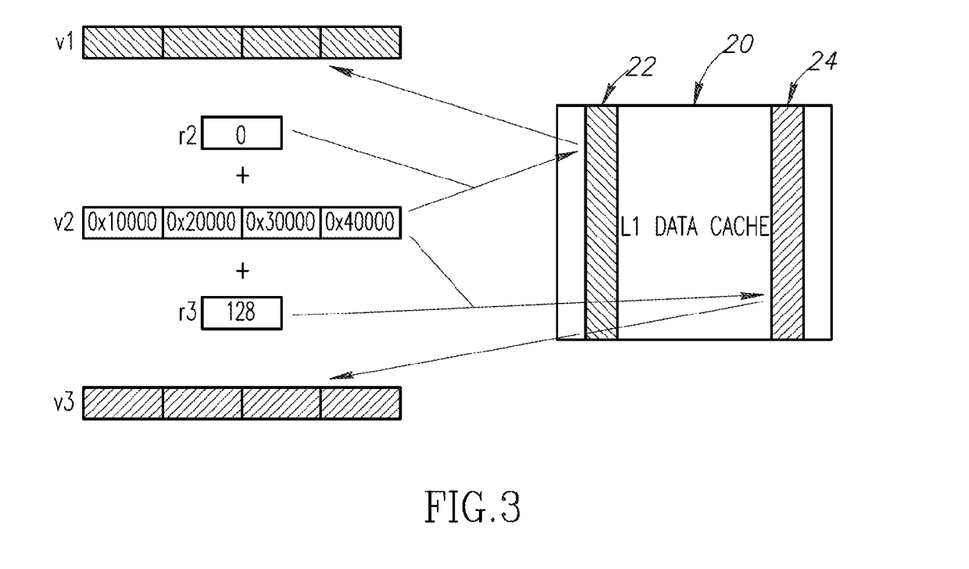
FIG. 3 is a block diagram illustrating an example of reading from multiple memory addresses.

A block diagram illustrating an example of reading from multiple memory addresses is shown in FIG. 3. A load multiple vector indexed instruction (lmvx) (not currently in the Power ISA) is used to load a vector of data reading from a plurality of memory locations. In this example, columns 22 and 24 of L1 data cache 20 are read using the lmvx instruction. The instruction lmvx, v1, v3, r2 is operative to read multiple memory locations from column 22 in v3 (base address)+r2 (offset) into vector register v1. Similarly, the instruction lmvx, v2, v3, r3 is operative to read multiple memory locations from column 24 in v3 (base address)+r3 (offset) into vector register v2.

There are, however, several disadvantages of the scheme shown in FIG. 3: (1) the data cache must be heavily ported to handle several requests in parallel which causes longer latency, larger cache size and higher power consumption; (2) alternatively, memory loads can be performed in serial fashion but with increased latency; (3) the probability of a cache miss increases with the number of data items 'gathered' which may cause stalls and flushes of the pipeline; (4) speculating on a cache hit and roll-back when a miss is detected may be very expensive; (5) the Load/Store Unit (LSU) has to track multiple accesses per cycle which adds delay, queue entries and complexity and the potential for the LSU to become clogged by a single request; and (6) considering that vector instructions are usually applied to large amounts of data processed in tight loops, when loops are unrolled by the compiler, the amount of memory traffic in tight loops may overwhelm the system.

As an example, consider the following matrix multiplication A×B=C, in which all elements are N×N matrices. A naïve implementation is as follows:

```
for (i=0; i<N; i++){
    for(j=0; j<N; j++){
        c[i][j] = 0;
        for(k=0;k<N; k++){
            c[i][j]+=a[i][k]*b[k][j]; }}}
```

If N is very large, there will likely be many cache misses. An alternative implementation breaks the matrix into $r^2$ submatrices and performs each one separately, where n=N/r. When vector code is used the data will be loaded using the lvx and lmvx instructions. In the example of C language code, instrinsics are used to force the compiler to use these particular instructions:

```
vector unsigned int v1, v2;        //defines 2 vectors of 4 words
                                   //(4x4=16 bytes)
v1 = vec_ld(&a);                   //read from address &a 16 bytes into v1
v2 = vec_ld(&a,&b,&c,&d);          //read from 4 addresses 16 bytes
                                   // into v2 (4 bytes from each address)
```

Consider the following block and vector matrix multiplication C language code example:

```
for (i=0; i<n; i++){
    for(j=0; j<n; j++){
        c[i][j] = 0;
        for(k=0; k<n; k+=4){
            v1 = vec_ld(&a[i][k]);
            v2 = vec_mld(&b[k][j],&b[k+1][j],
                &b[k+2][j],&b[k+3][j]);
            v3 = v1*v2;
            v3 = vec_sums(v3); //sum across v3
            c[i][j]+= v3; }}}
```

The above code, however, is still not efficient since the data from 'b' is read from different cache lines each time. For example, in two iterations of the inner loop, eight different cache lines are read from matrix B In another C language code example, the indexing is changed to iterate the inner loop on 'j' and the middle loop on 'k'. The code reads from matrix 'b' across all four cache lines.

```
for (i=0;i<32;i++){
    for(k=0;k<32;k+=4){
        c[i][j] = 0;
        v1 = vec_ld(&a[i][k]);
        for(j=0;j<32;j++){
            v2 = vec_mld(&b[k][j],&b[k+1][j],
                &b[k+2][j], &b[k+3][j]);
            v3 = v1*v2;
            v3 = vec_sums(v3); //sum across v3
            c[i][j]+= v3; }}}
```

In this example, n=32 in order to maximize the reading of a cache line. In this case, only four cache lines are read from. Nevertheless, this still puts a strain on the L1 data cache.

Figure 4:
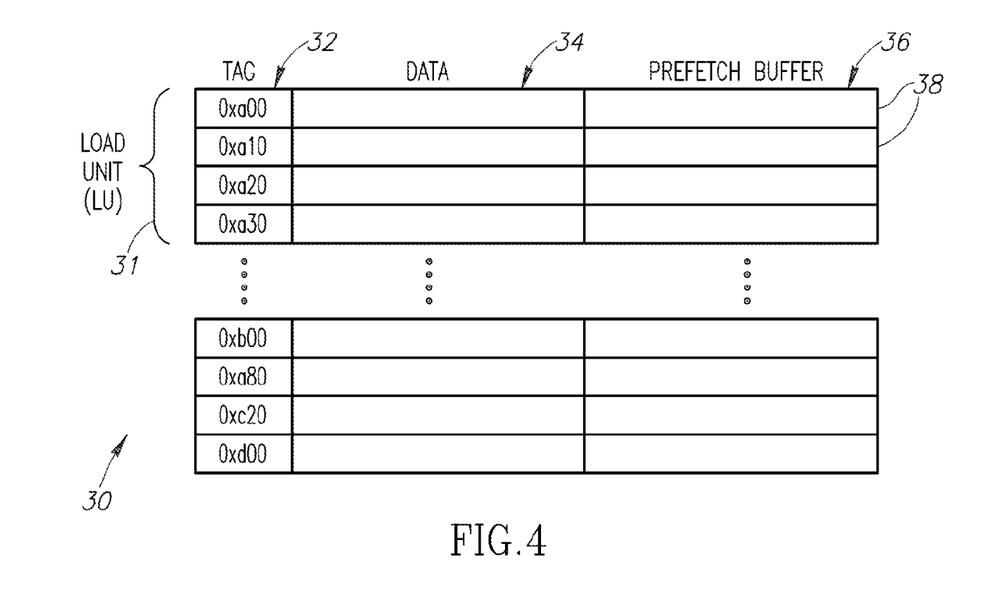
FIG. 4 is a block diagram illustrating a first example embodiment of a vector gather buffer.

In another embodiment, an array of buffers referred to as a vector gather buffer (VGB) is used to store a plurality of entries. A block diagram illustrating a first example embodiment of a vector gather buffer is shown in FIG. 4. Each VGB block 30 comprises a tag 32, data 34 (e.g., 128 bytes) and an optional data array (prefetch buffer) 36 used for prefetching data. When a vector gather instruction (e.g., lmvx) is decoded it is handled by the VGB. The number of entries in the VBG preferably is related to the number of gather items in an instruction. For example, if an lmvx instruction can load items from k distinct addresses, the number of entries should be n*k.

Each set of k entries is defined as a Load Unit (LU) 31. Data is read from an LU into a Vector Register (VR). Note that in one embodiment, all entries in an LU are fetched together. The K addresses generated by the instruction are compared to the K tags in each LU and if a match is found, a 'hit' is declared and data can be loaded from the LU. If none of the tags in the LUs match, then a 'miss' is declared and one of the LUs data is replaced.

In the example shown in FIG. 4, each LU 31 comprises four buffer entries 38 where each entry holds data from four addresses. It is appreciated that the VGB may comprise any number of LUs and each LU may comprise any number of entries, where the number of entries is typically a power of two.

Figure 5:
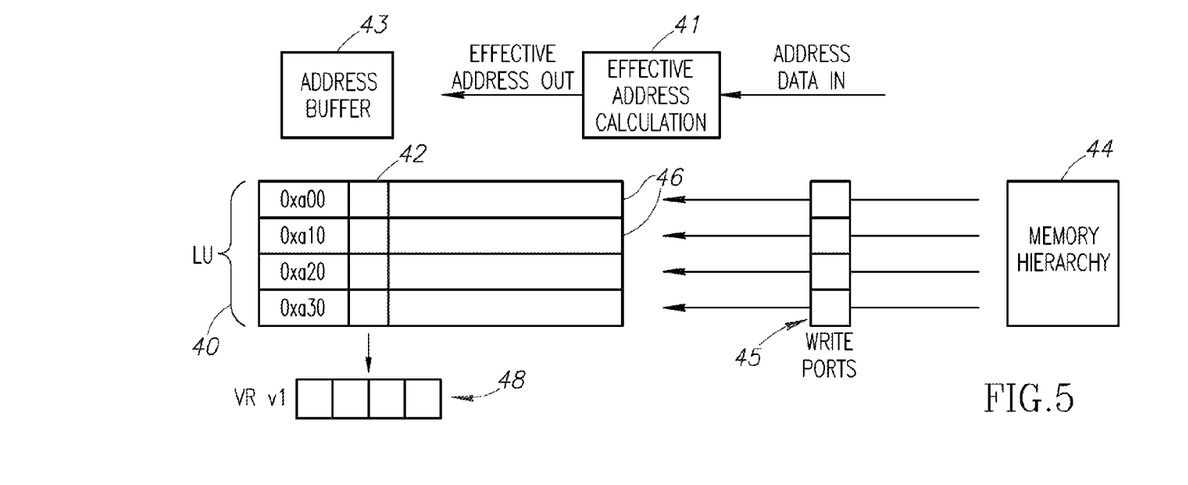
FIG. 5 is a block diagram illustrating a second example embodiment of a vector gather buffer.

A block diagram illustrating a second example embodiment of a vector gather buffer is shown in FIG. 5. When a gather instruction is executed (e.g., lmvx v1, v3, r2) the effective addressees (EAs) in v3 (base address)+r2 (offset) are computed using effective address calculation logic circuitry 41 within the VGB. The effective address calculation circuit receives one or more address data as input and calculates one or more effective addresses as outputs. The relevant cache lines (if not already in the VGB) are read and stored in a small address buffer 43 within the LU. The register to be loaded is provided from the address buffer 43. Consecutive loads are also provided from the address buffer 43. The address buffer also detects the stride of consecutive loads and initiates prefetch operations for all data streams.

For example, vector register v3 and offset register r2 are used to calculate the effective addresses. The data in these addresses are read from the memory hierarchy 44 from addresses 0xa0000, 0xa1000, 0xa2000, 0xa3000 (assuming they are not already in the LU) and stored in the four entries 46 in one of the LUs 40 of the VGB. The tag values 0xa00, 0xa10, 0x20, 0x30 function to indicate that the data stored in the LU is from addresses 0xa0000, 0xa1000, 0xa2000, 0xa3000. Four words 42 are read from the LU into vector register v1 48.

In one embodiment, the VGB comprises four cache lines in an LU and one or more (if there are less than four, loading the VGB is performed serially) write ports 45 that fill the rows of the LU buffer. The VGB comprises a read port 42 that reads columns of word data across the four buffer entries that is to be loaded into the vector register 48.

Figure 6:
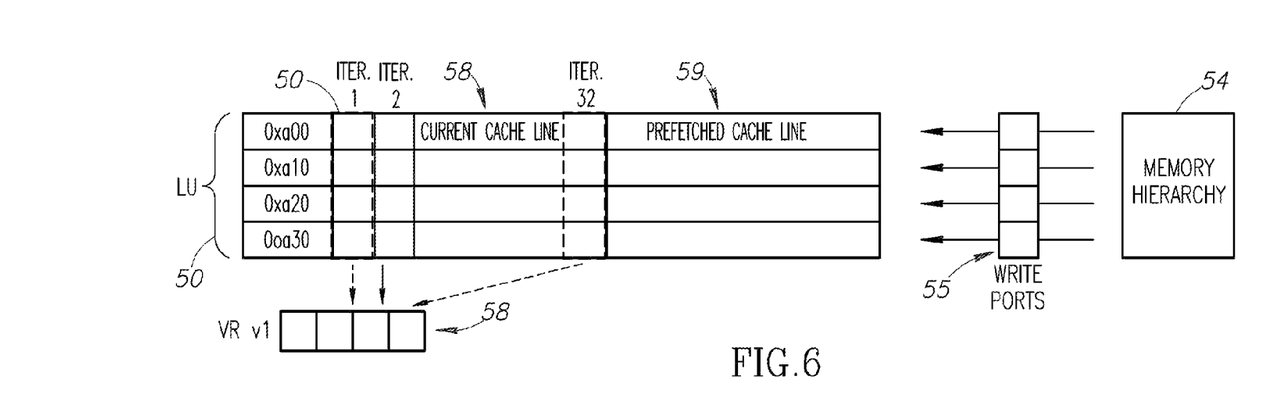
FIG. 6 is a block diagram illustrating a third example embodiment of a vector gather buffer.

A block diagram illustrating a third example embodiment of a vector gather buffer is shown in FIG. 6. In this illustrative example, the code comprises a loop that reads from 0xa0000, 0xa1000, 0xa2000, 0xa3000 (i.e. iteration #1) and then from 0xa0004, 0xa1004, 0xa2004, 0xa3004 (i.e. iteration #2) and then from 0xa0008, 0xa1008, 0xa2008, 0xa3008 (i.e. iteration #3) and so on up to iteration 32. The first read pays the 'penalty' of collecting all four cache lines 58 in the LU 50. Subsequent reads, however, will be immediately available. In this example with 128 byte cache lines and depending on the application, this can continue for 32 iterations until the buffers are emptied.

Once all 32 iterations have been completed, the VGB is replenished from the cache (i.e. memory hierarchy 54 via write ports 55). In an alternative embodiment, an additional cache line buffer can be added to each VGN line and the next cache lines can be prefetched using any well-known prefetch mechanism. Further, this can be implemented in a circular manner whereby one buffer 58 is the current line used and the other 59 is used to prefetch the data. This technique also simplifies prefetching since four lines 59 are prefetched using a single prefetch buffer entry. Note that when buffer a miss occurs, the appropriate buffer is read from the L1 data cache. If a miss occurs in the L1 data cache, the load is stalled until all the items are present in the VGB. This serves to simplify the control of multiple cache misses.

Figure 7:
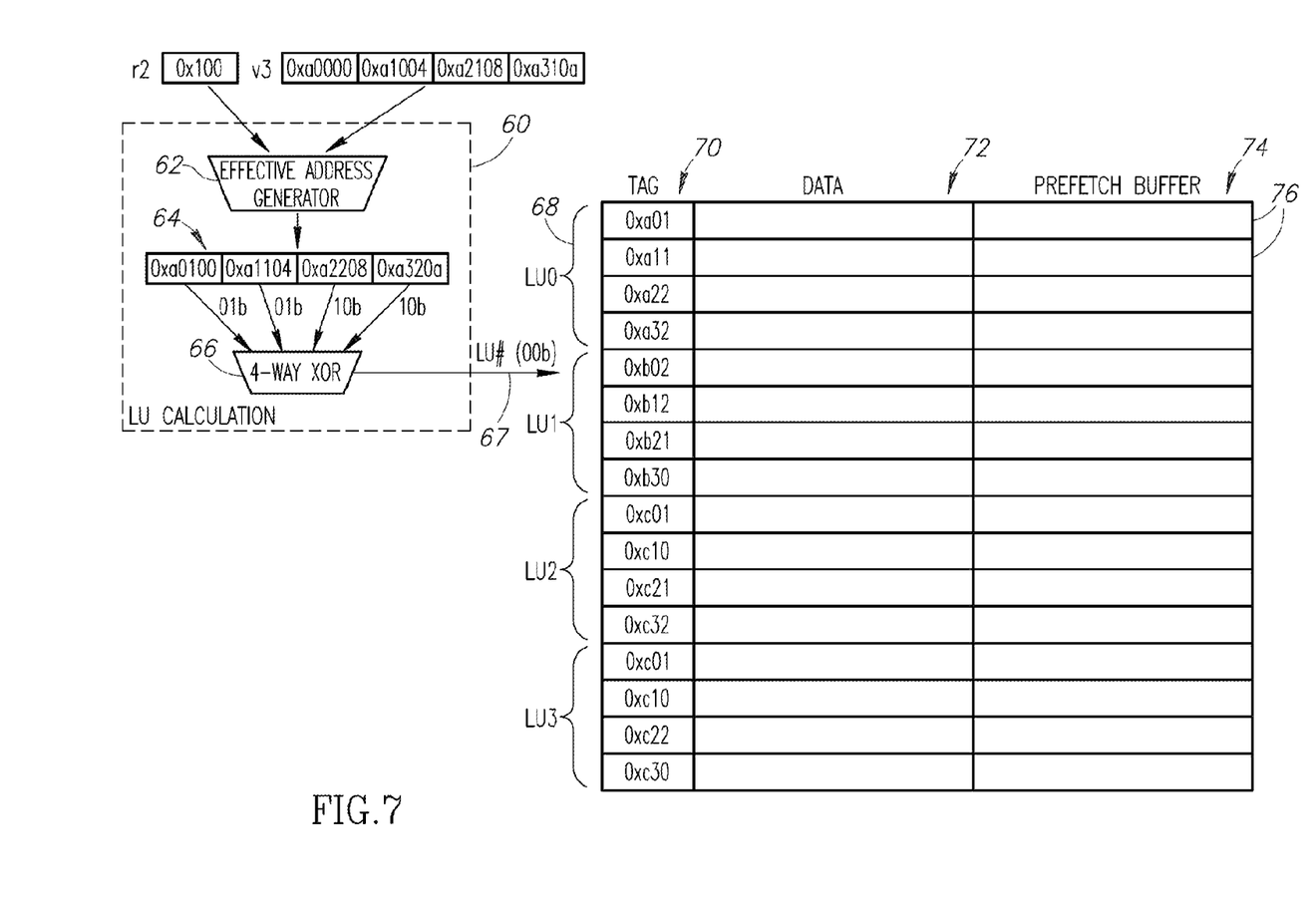
FIG. 7 is a block diagram illustrating the addressing logic portion of the vector gather buffer.

A block diagram illustrating the addressing logic portion of the vector gather buffer is shown in FIG. 7. The VGB comprises logic circuitry to calculate the effective addresses (EAs) from the arguments of the lmvx instruction and to use those addresses to access one of the LUs. The block diagram in FIG. 7 illustrates how the calculation of the EAs is performed when the example instruction lmvx v1, v3, r2 is executed. Vector register v3 contains the base address arguments while r2 contains the offset argument. The EA generator 62 calculates the four effective addresses (i.e. base address+offset for each argument) which are stored in register 64.

After the EAs have been generated, one of the LUs is then selected in a process referred to as mapping. Assuming the buffer is a cache line long (i.e. 128 bytes in this example), then 7-bits of each EA are used to address intra-buffer data. The next $\log_2(N)$ bits of the EA are used to access the relevant LU.

Assuming the VGN comprises four LUs, bits 8-9 of the EA are used to select the LU. Bits-8-9 of the EA are called the "LU field." It is appreciated that a larger or smaller number of bits may be used depending on the number of LUs and the particular implementation. The next step is to create a hash function of the bits. In one example embodiment, all the LU fields of the four addresses are XORed together (i.e. 01^01^10^10=00) using 4-way XOR 66 to generate the 2-bit LU# selection 67 (00 mapping to LU0 in this example). Thus, the first LU (LU0) in the VGB is mapped and accessed. Note that each LU 68 comprises a plurality of four lines 76 each having a tag portion 70, data portion 72 and optional prefetch buffer 74.

Figure 8:
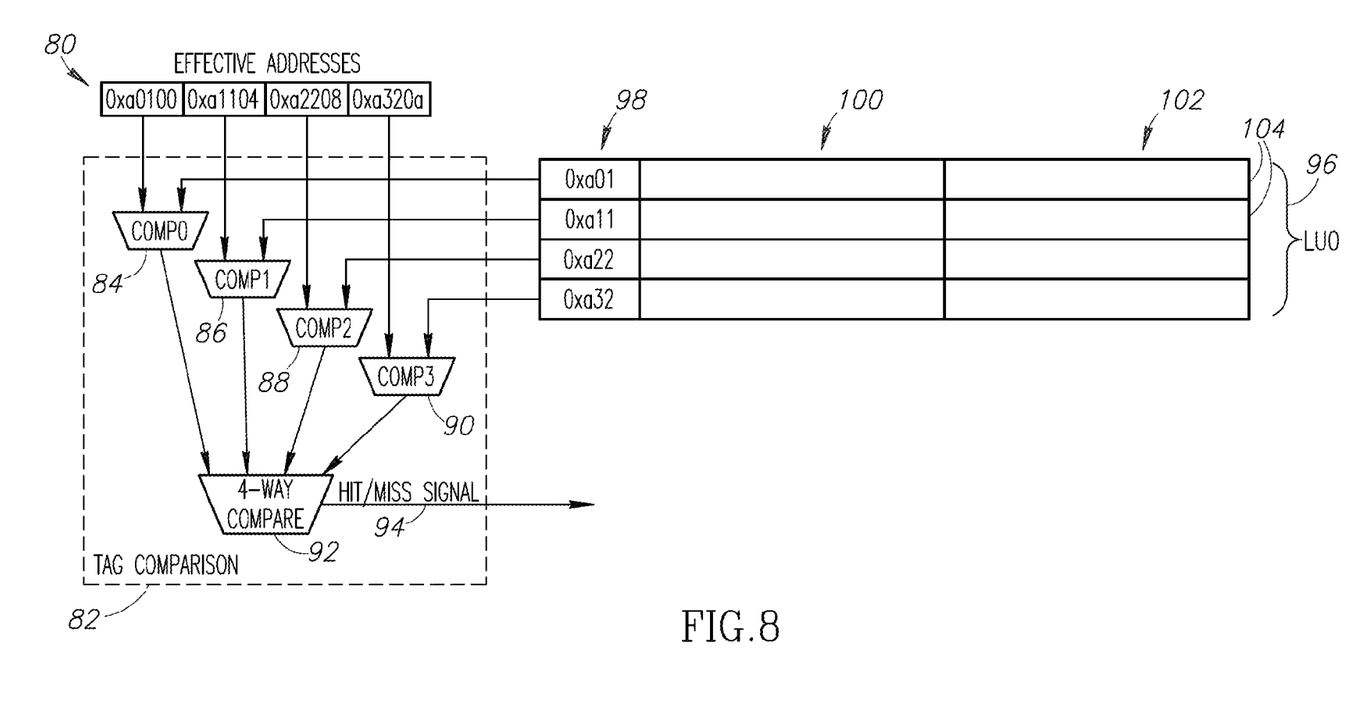
FIG. 8 is a block diagram illustrating the tag comparison logic portion of the vector gather buffer.

A block diagram illustrating the tag comparison logic portion of the vector gather buffer is shown in FIG. 8. After an LU has been mapped, a test is performed to check whether the relevant data is stored in it. The tag portion of the VGB entry comprises the address of the data stored in the entry. In order to utilize an LU, all tag entries (four in this example) must match the tag part of the effective addresses computed. Partial tag matches are handled as well as described in more detail infra. If all tag address comparisons match, the hit/miss signal is set to '1' and data extraction from the LU can proceed. If, however, one or more tag address comparisons fail, the hit/miss signal is set to '0' and data must be loaded from the memory hierarchy.

In operation, the effective addresses 80 are input to a tag comparison logic circuit 82 which comprises individual comparators COMP0 84, COMP1 86, COMP2 88, COMP3 90, and 4-way comparator 92 which generates the hit/miss signal 94. Each comparator COMP# functions to compare one of the effective addresses 80 with a corresponding tag address 98 in the LU 96. Each line of the LU comprising a tag address portion 98, data portion 100 and optional prefetch portion 102.

Once it has been determined that the data in the LU matches the addresses requested, the specific words are then extracted. The offset of each word from the beginning of the buffer is computed by taking the 7 LSBs of the address (for 128 bit entries). It is appreciated that the offset may comprise a different number of bits depending on the width of the LU data entry.

Using the 7 LSBs of the address, there are three alternative schemes for extracting the actual words from the LU: (1) use a separate port for each word; (2) implement the VGB as a shift register; and (3) enforce a uniform offset.

Figure 9:
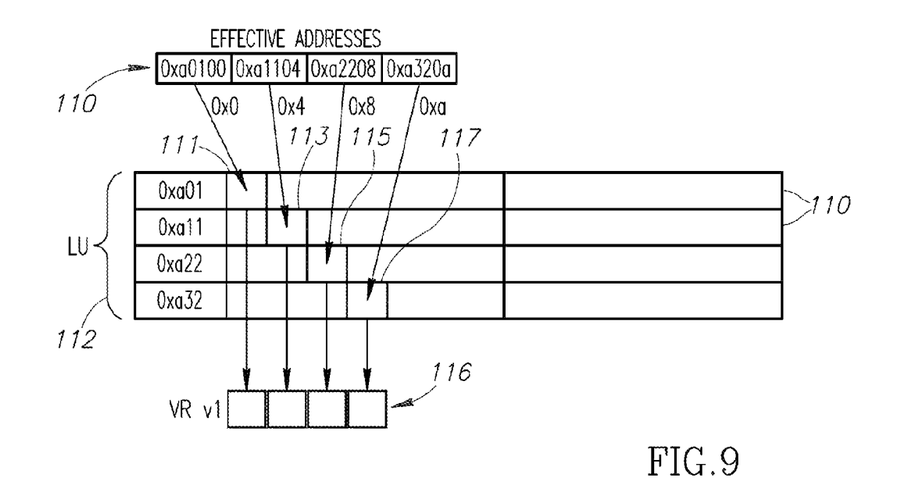
FIG. 9 is a block diagram illustrating a data extraction example incorporating a port for each buffer.

In the first scheme, a separate port is used for each word. A block diagram illustrating a data extraction example incorporating a port for each buffer is shown in FIG. 9. The EAs 110 each reference a separate word 111, 113, 115, 117 in the LU 112. The LSBs of each EA are used to address a particular word in each buffer line 114. The four words are stored in vector register v1 116. This alternative is, however, relatively costly as it increases the size of the VGB.

Figure 10:
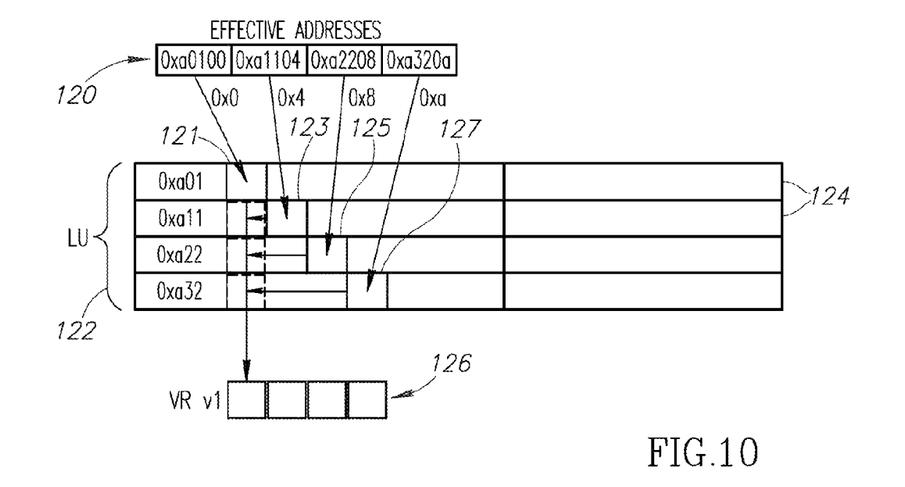
FIG. 10 is a block diagram illustrating a data extraction example incorporating a shift within each buffer.

In a second scheme, each VGB entry is implemented as a shift register. A block diagram illustrating a data extraction example incorporating a shift within each buffer is shown in FIG. 10. As in the first scheme described supra, the EAs 120 each reference a separate word 121, 123, 125, 127 in the LU 122. The LSBs of each EA are used to address a particular word in each buffer line 124. The four words are each shifted an appropriate amount until all the entries are aligned and can be extracted together and stored in vector register v1 126. Note that this scheme is applicable when the number of entries is relatively small (e.g., four).

Figure 11:
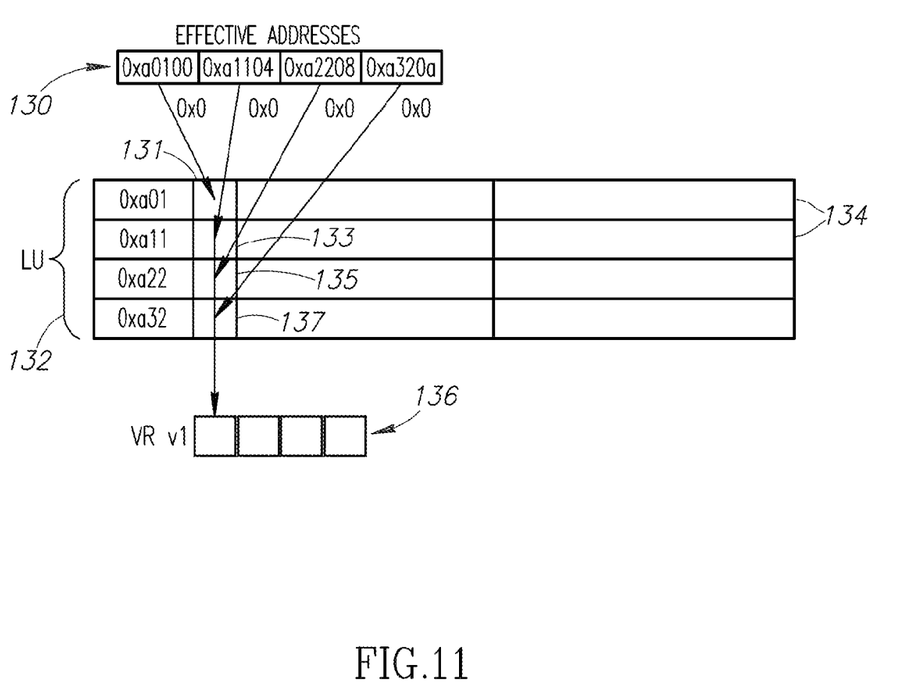
FIG. 11 is a block diagram illustrating a data extraction example incorporating an alignment of the first item.

In a third scheme, a uniform offset is enforced for all items. A block diagram illustrating a data extraction example incorporating an alignment of the first item is shown in FIG. 11. As in the first scheme described supra, the EAs 130 each reference a separate word 131, 133, 135, 137 in the LU 132. The LSBs of each EA are used to address a particular word in each buffer line 134. The four words are aligned and can be extracted together and stored in vector register v1 136. In this scheme, the data items are aligned on the same offset. If they are not, the address items are truncated to the offset of the first item in the group. Although this scheme is fairly restrictive, it is noted that truncating addresses is a well-known technique used in many instructions to force alignment (along with other constraints) on their arguments. For example, the standard lvx instruction (i.e. load data into a vector register) truncates all addresses so that they align with 16 (i.e. the four LSBs are set to '0'). Note also that this third scheme is likely the simplest and least costly of all three schemes to implement.

Although not constructed as a conventional cache, the VGB has some cache like characteristics as discussed below. First, when an instruction accesses the VGB, it is mapped to one of the LUs. The example presented herein assumes direct mapping (i.e. each instruction is mapped to a single LU) which is the simplest and fastest technique. In this case, however, it is possible that several lmvx instructions in a loop will replace each other. Alternatively, set or Fully Associative (FA) caching lookup can be performed. This introduces, however, added complexity and delay.

Second, a replacement method is applied only when a miss is encountered when set or fully associative mapping is used. The replacement method may comprise any well-known methods such as LRU, FIFO, Random, etc. When direct mapping is used, the LU mapped is overwritten with new data read out from the memory hierarchy.

Third, regarding coherency, reading from a cache line in a buffer may result in incorrect results if the corresponding line in the cache has been written to (from the same or another process). A coherency protocol between the L1 data cache and the VGB should preferably be established in this case. For example, the well-known Modified/Shared/Invalid (MSI) coherency protocol can be applied to the VGB.

Fourth, in an alternative embodiment, the VGB may comprise a Vector Scatter Buffer (VSB) whereby vector multiple store instructions write into the buffer. As most conventional cache hierarchies support write-through protocols (i.e. data stored is written at least to the L2 level if not to main memory), it is simpler to use already existing well-known write buffer mechanisms.

Fifth, although setting block size to the same size as the L1 data cache line simplifies data transfer and coherency, it is not always required. For example, if gather instructions have strides less than a cache line it is more efficient to store smaller blocks in the LUs.

As described supra, each LU functions as an independent unit that reads K items from K cache lines. Before data can be loaded into the vector register, tag addresses for all buffer entries (e.g., K=4 in this example) must match their corresponding effective addresses. If less than K items match, one of the following three schemes may be used.

In a first scheme, the entire LU is replaced even if some cache lines are loaded again. In a second scheme, only the lines that have generated misses are replaced. In a third scheme, each LU is operative to read from every block in the VGB using a Fully Associative Content Addressable Memory (CAM), for example. This, however, promotes the VGB to a full fledged cache with all its ensuing complexity.

In another possible scenario, several items are located within the same cache line.

Consider, for example, the addresses: 0x20010, 0x20020, 0x30030, 0x30040. In this case, several schemes for handling such cases include: (1) storing several copies of the same cache line in an LU; (2) disallowing multiple copies of the same cache line in an LU and detecting that several items are located within the same cache line and in response serializing the buffer reads; and (3) adding logic circuitry that is operative to read multiple data items from the same block in the LU.

Note that in the case where the above scenario is common, it is preferable that the block sizes in the VGB be reduced to minimize the potential for such a case to arise. Alternatively, variable sized blocks can be used in the VGB.

In another embodiment, dedicated VGB instructions are used. The VGB is implemented so as to be transparent to the programmer or one or more VGB handling instructions are added, such as the following:

vgb_enable R1: if R1 is 0 disable VGB otherwise enable its use.

vgb_flush: flush the contents of the VGB.

vgb_prefetch R1, R2: perform a prefetch from the addresses in R1+0*R2, R1+1*R2, R1+2*R2, . . . R1+(k−1)*R2. Use the address in scalar register R1 and the stride in scalar register R2.

vgb_prefetch V1: prefetch from the k addresses stored in vector register V1.

Note that other instructions may be implemented depending on the particular implementation of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A vector gather buffer (VGB) for use in a processor, comprising:
   a plurality of multi-line load units (LUs), each including a plurality of buffer entry lines, each buffer entry line comprising a data field including a plurality of data items;
   at least one write port for loading data into the buffer entry lines from a memory unit, such that each buffer entry line receives consecutive data from the memory unit, and each buffer entry line of a multi-line load unit receives separately addressed data;
   at least one read port operative to read a plurality of data items from buffer entry lines of a single multi-line load unit and store said data items in an output vector register, such that the output vector register receives data items from a plurality of different buffer entry lines of the multi-line load unit; and
   control circuitry configured to:
      receive indication of a plurality of memory addresses to be fetched together,
      determine whether the content of the plurality of memory addresses are all currently stored in a single multi-line load unit in a manner retrievable through the at least one read port,
      load one or more buffer entry lines with the content of one or more of the plurality of addresses, from the memory unit, so that the content of all the memory addresses are stored in a single multi-line load unit in a manner retrievable through the at least one read port, if required according to the determination; and
      provide the content of the plurality of memory addresses through the at least one read port to the output vector register.

2. The apparatus according to claim 1, further comprising a prefetch field in each said buffer entry line.

3. The apparatus according to claim 1, wherein the number of buffer entry lines is a multiple of the number of data items to be gathered in a processor instruction.

4. The apparatus according to claim 1, further comprising a prefetch logic circuit operative to detect the stride of consecutive loads and initiate a prefetch operation for data to be read into said buffer entry lines.

5. The apparatus according to claim 1,
   wherein the control circuitry includes an effective address calculation circuit operative to generate the plurality of addresses to be fetched together in accordance with an input base address and offset.

6. The apparatus according to claim 5, wherein said effective address calculation circuit is operative to perform a mapping function to determine the LU to be accessed.

7. A method of extracting data from a vector gather buffer (VGB) for use in a processor, said method comprising:
   providing a plurality of load units (LUs), each load unit comprising a plurality of buffer entry lines, each buffer entry line comprising a plurality of separately addressable data items;
   providing at least one read port operative to read data items from a single load unit (LU) and store said data items in an output vector register, such that output vector register receives values from a plurality of different buffer entry lines of the multi-line load unit;
   receiving indication of a plurality of memory addresses to be fetched together;
   determining whether the content of the plurality of memory addresses are currently stored in a single load unit in a manner retrievable through the at least one read port;
   load one or more buffer entry lines with the content of one or more of the plurality of addresses, from a memory unit, if the determination found the content was not currently stored in a load unit in a manner retrievable through the at least one read port; and
   providing the content of the plurality of memory addresses from one of the LUs through the at least one read port to the output vector register.

8. The method according to claim 7, comprising performing a mapping function to determine the LU to be accessed.

9. The method according to claim 7, wherein providing at least one read port comprises providing a separate read port for reading each data item from said LU.

10. The method according to claim 7, further comprising providing a shift register for said buffer entry lines and shifting each line an appropriate amount until all data items are aligned thereby enabling extraction of all data items from said LU simultaneously.

11. The method according to claim 7, wherein the at least one read port is operative to read only sets of items having a same offset in the buffer entry lines of an LU.

12. A vector gather buffer (VGB) according to claim 1, wherein each buffer entry line includes a tag field and the control circuitry includes
   a tag comparison circuit operative to compare all tag entries in an LU with corresponding effective addresses calculated and if all comparisons match, declare a hit signal and extract data from said LU via said read port in accordance with said calculated effective addresses.

13. The apparatus according to claim 12, wherein said effective address calculation circuit is operative to perform a mapping function to determine the LU to be accessed.

14. The method of claim 7, wherein
   each buffer entry line comprises a prefetch field.

15. The apparatus of claim 1, wherein each of the multi-line load units includes a predetermined number of lines equal to the number of elements in the output vector.

16. The apparatus of claim 15, wherein the control circuitry is operative to determine whether the content of the plurality of memory addresses are currently stored in a multi-line load unit by calculating a specific LU in which the addresses should be stored and checking that specific LU.

17. The apparatus of claim 16, wherein the control circuitry is operative to calculate the specific LU as a function of all the plurality of addresses.

18. The apparatus of claim 1, wherein the control circuitry is operative to determine whether the content of the plurality of memory addresses are currently stored in a multi-line load unit using an associative lookup.

19. The apparatus of claim 1, wherein the at least one write port is configured to load the different buffer entry lines of a single multi-line load unit independently, such that the different buffer entry lines of a single multi-line load unit may receive data from non-adjacent locations in the memory.

20. The apparatus of claim 1, wherein the at least one read port is operative to read data items such that each element of the output vector register receives a value from a single item of a different buffer entry line of the multi-line load unit.

21. The apparatus of claim 1, wherein the at least one read port is operative to read data items such that the output vector receives from any line of the multi-line load unit only a partial portion of the line.

22. The method of claim 7, wherein each element of the output vector register receives a value from a single item of a different buffer entry line of the multi-line load unit.

\* \* \* \* \*